June 24, 1924.
H. NEUMANN, SR., ET AL
HILL BRAKE FOR VEHICLES
Filed Feb. 14, 1922
1,499,244
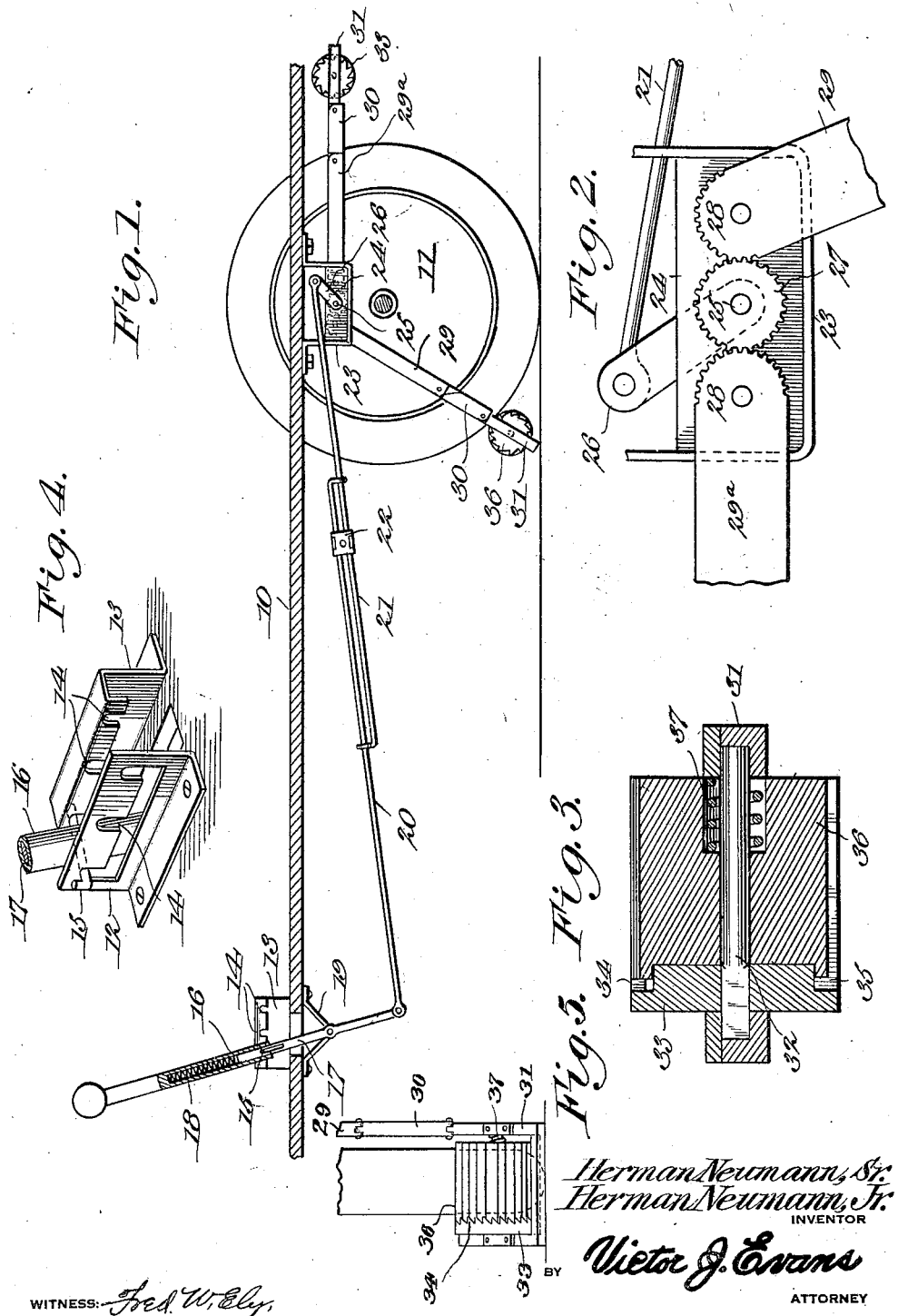

Patented June 24, 1924.

1,499,244

UNITED STATES PATENT OFFICE.

HERMAN NEUMANN, SR., AND HERMAN NEUMANN, JR., OF NEW YORK, N. Y.

HILL BRAKE FOR VEHICLES.

Application filed February 14, 1922. Serial No. 536,585.

*To all whom it may concern:*

Be it known that we, HERMAN NEUMANN, Sr., and HERMAN NEUMANN, Jr., citizens of the United States, residing at New York, in the county of New York and State of New York, have invented new and useful Improvements in Hill Brakes for Vehicles, of which the following is a specification.

This invention relates to brakes for vehicles and particularly to brakes for use on hills where it may be desired to stop the vehicle entirely and to positively hold it against further movement.

One of the principal objects of the device is to produce means for this purpose which shall be simple of construction, cheap to manufacture and highly efficient for the purpose for which it is intended.

Another object is to produce manually controlled means which may be brought into co-operation with either the front or rear of the vehicle wheel to prevent movement in the respective directions.

Another object is to produce a device of this nature which shall be so constructed that it may be readily adjustable to any desired type of vehicle.

With these and other objects in view the invention resides in certain novel construction and combination and arrangement of parts, the essential features of which are hereinafter fully described, are particularly pointed out in the appended claims, and are illustrated in the accompanying drawing, in which:—

Figure 1, is a side elevation of our improved vehicle brake.

Figure 2, is an enlarged detail of the gear mechanism, and

Figure 3, is a detail view of one of the blocks.

Figure 4 is a detail perspective view of the handle lock.

Figure 5 is a detail end elevation of a brake block.

Like characters of reference refer to like parts in all views.

Referring to the drawing in detail, 10 represents the floor of an automobile or other vehicle and 11 is one of the wheels thereof. Secured to the upper face of the floor 10 are members 12 and 13 which are provided with notches 14 for receiving a pin 15 mounted in a handle or manipulative member 16. The handle 16 is movable longitudinally on a bar 17, and a spring 18 tends constantly to force the member 16 to such position that the pin 15 will be seated in one or another of the notches 14. There are three notches 14 in each of the members 12 and 13, the middle notch being neutral position, the forward notch indicating that the brake is on the front face of the wheel, and the rear notch that the brake is on the rear face of the wheel.

Secured to the lower end of the rod 17, which is pivoted to a bracket at 19, is a reach bar 20, which embraces with its rear end, a second reach bar 21, the latter embracing the reach bar 20 with its forward end. The two reach bars 20 and 21 are thus relatively movable and may be adjustable to various lengths in accordance with the style and make of the car. A clamp 22 secures the reach bars together and holds them in any desired relation.

Mounted on the bottom of the member 10, is a bracket 23 or other supporting structure and mounted thereon are bearings 24 in which a stub shaft 25 is rotatably mounted. One end of the stub shaft 25 is connected by a link 26 with the rear end of the reach bar 21; and the other end supports a gear wheel 27 which is secured to said stub shaft so as to be rotatable thereby. The gear wheel 27 meshes with gear segments 28, on forwardly and rearwardly extending arms 29 and 29$^a$. Hinged at the free ends of members 29 and 29$^a$ are second joints 30 which have hinged at their free ends brake supports 31.

The supports 31 are in the form of U-shaped brackets in which shafts 32 have their bearings. One end of each shaft is squared off and fit into a square bearing so that the shaft proper may not turn with the brake block. Secured to one end of the shaft 32 so as to be maintained against rotation is a block 33 having inwardly facing ratchet teeth 34 adapted to co-act with ratchet teeth 35 on a brake block 36, rotatably mounted on the respective shafts 32. A spring 37 bears constantly against the other face of the block 36 so as to force the teeth 35 into engagement with teeth 34. It will thus be seen that the brake blocks 36 are free to rotate in one direction but are held against rotation in the opposite direction. The members 33 connected with the respective members 29 and 29$^a$ have their teeth set in opposite directions so that the respective brake blocks will be held against turning when moved into contact with the respective sides of the vehicle wheel 11.

It will now be evident that with the device in the neutral position, neither of the blocks 36 will contact with the wheel 11 and consequently the operation of the vehicle will not be interfered with. But when the handle 16 is moved forwardly, the forward arm 29 will be thrown downwardly and its block 36 will be brought into engagement with the front of the vehicle wheel and drawn downwardly until it prevents movement of the wheel and of the vehicle. In case it is desired to stop the vehicle while going up hill, the handle 16 is pulled into its rearmost position, whereby arm 29$^a$ will be thrown down so that its brake block 36, will be brought into contact with the rear of the wheel 11 and will be drawn down until it is in position to prevent retrograde movement of the vehicle. By providing the arms 29 and 29$^a$ with joints it will be understood that upon movement of the wheel in the direction to which it is being blocked, the tendency of the wheel would be to ride over the block 36. This force is utilized to break the joint thereby jamming the block 36 into closer engagement with the yieldable tire.

While we have herein fully shown and described and have pointed out in the appended claims, certain novel features of construction, arrangement and operation which characterize our invention, it will be understood by those skilled in the art that various omissions, substitutions and changes in the forms, proportions, sizes, of the materials used, and of their operation, may be made without departing from the spirit of our invention.

What we claim as new is:

1. In a device of the class described, the combination of a hand lever, a pair of braking blocks operable thereby, and a single gear operable by said hand lever for operating both of said blocks, whereby a vehicle may be held from movement in a forward or backward direction.

2. In a device of the class described, the combination of a hand lever, a pair of braking blocks operable thereby, and a single gear operable by said hand lever for concomitantly moving one of said brake blocks into operative position and the other out of operative position.

3. In a device of the class described the combination of an adjustable manipulative element, an adjustable reach member operable thereby, gearing operable by said reach member, and a plurality of braking members operable by said gearing, said brake members adapted to contact with the wheel of a vehicle.

4. In a device of the class described, the combination of a manipulative member, a reach member secured to said manipulative member and capable of adjustment, gearing operable by said reach member, a plurality of jointed arms operable by said gearing and braking elements individual to each of said arms for co-action with a vehicle wheel on opposite sides of the axle.

5. In a device of the class described, the combination of a manipulative member, a reach member secured to said manipulative member and capable of adjustment, gearing operable by said reach member, a plurality of jointed arms operable by said gearing, braking elements individual to each of said arms, and means for preventing movement of said braking elements in one direction.

In testimony whereof we have affixed our signatures.

HERMAN NEUMANN, Sr.
HERMAN NEUMANN, Jr.